US010386975B2

(12) United States Patent
Moseley

(10) Patent No.: US 10,386,975 B2
(45) Date of Patent: Aug. 20, 2019

(54) CAPACITIVE SENSOR

(71) Applicant: Tactual Labs Co., New York, NY (US)

(72) Inventor: Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 43 days.

(21) Appl. No.: 15/690,234

(22) Filed: Aug. 29, 2017

(65) Prior Publication Data

US 2018/0059825 A1 Mar. 1, 2018

Related U.S. Application Data

(60) Provisional application No. 62/381,314, filed on Aug. 30, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01); *G06F 2203/04107* (2013.01); *G06F 2203/04111* (2013.01)

(58) Field of Classification Search
CPC ......... G06F 2203/04111; G06F 3/0416; G06F 3/044; G06F 2203/04102; G06F 2203/04104; G06F 2203/04107; G06F 3/014
USPC ................................................ 345/170–176
See application file for complete search history.

(56) References Cited

U.S. PATENT DOCUMENTS

| 8,692,799 | B1 | 4/2014 | Landry et al. | |
|---|---|---|---|---|
| 2004/0239650 | A1 | 12/2004 | Mackey | |
| 2010/0182275 | A1* | 7/2010 | Saitou | G06F 3/044 345/174 |
| 2012/0062472 | A1 | 3/2012 | Yilmaz | |
| 2012/0315444 | A1* | 12/2012 | Yeh | G06F 3/044 428/189 |

(Continued)

FOREIGN PATENT DOCUMENTS

| KR | 1020090114505 | 11/2009 |
|---|---|---|
| KR | 1020150039041 | 4/2015 |

*Primary Examiner* — Tony O Davis
(74) *Attorney, Agent, or Firm* — Adam Landa

(57) ABSTRACT

A mutual capacitive touch sensor is provided having a sensing area comprising at least three conductive elements. The three elements are oriented on a substrate such that they are all conductively isolated, and that within the sensing area of the substrate two of the elements cross, but the third does not. The three elements are further organized on the substrate such that each of the crossing elements has a relationship with the non-crossing element such that for any two points on a crossing element, the nearest point to each on the non-crossing conductor is a different distance away. A fourth element (non-crossing) may be added that has the same relationship with the crossing elements. Repeating use of the three or four element patterns can be used to cover wider areas. The sensor may be configured in a single layer with one bridge per cross, or on multiple layers, such as on opposite sides of a substrate. Rectangular sensors, for example, may be configured with all electrical access on a single edge, permitting near bezel-less designs on three edges.

8 Claims, 9 Drawing Sheets

(56) References Cited

U.S. PATENT DOCUMENTS

2015/0331526 A1* 11/2015 Hashida ................ G06F 3/044
                                                                         345/174

* cited by examiner

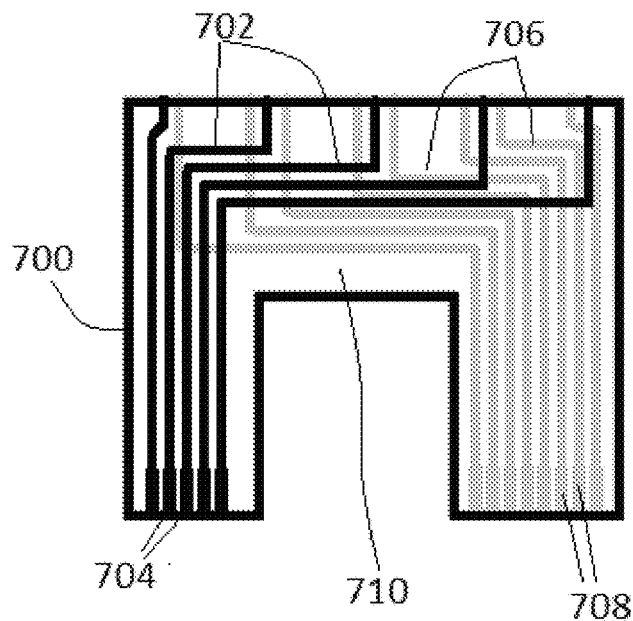
FIG. 7A
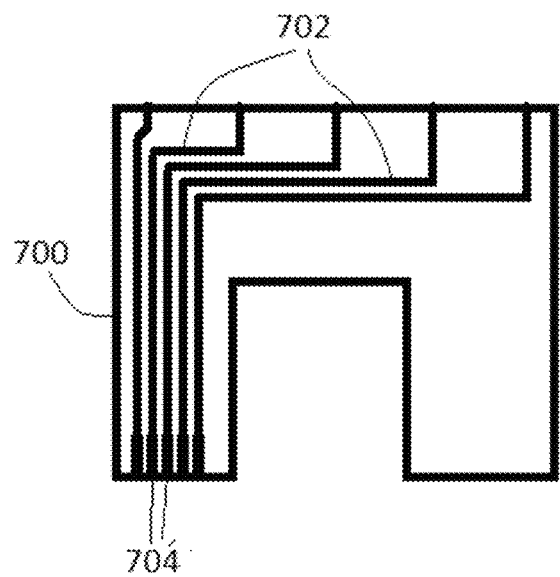 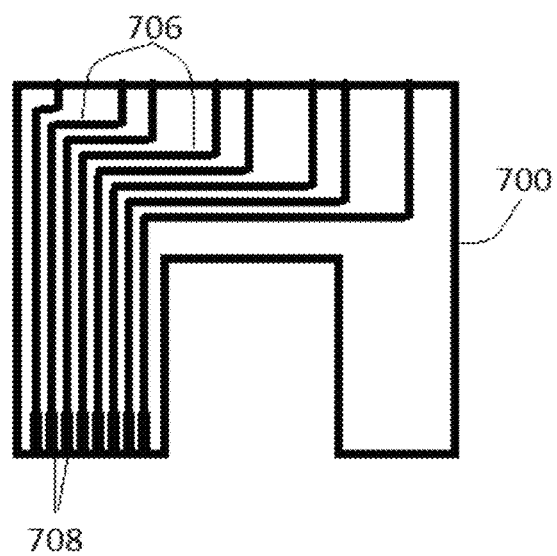
FIG. 7B         FIG. 7C

CAPACITIVE SENSOR

This application is a non-provisional of and claims priority to U.S. Provisional Patent Application No. 62/381,314 filed on Aug. 30, 2016 and entitled SINGLE SIDED DRIVE CAPACITIVE SENSOR.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The disclosed systems and methods relate in general to the field of sensing, and in particular to capacitive sensing using a single sided drive capacitive sensor.

BACKGROUND OF THE INVENTION

Touch sensitive devices are popular as input devices to various computing systems and other devices due to their ease of use and versatility. A touch sensitive device generally includes a touch surface which may, in various applications, be a clear translucent or opaque. In many applications (e.g., smart phones, smart watches, touch-screen tv and touch-screen monitors) a clear touch surface includes a display device that enables a touch interface which, through appropriate software and hardware, allows a user to interact with the display. In other applications (e.g., touch pads) the touch surface does not include a display device that is viewed therethrough. Many methods and apparatus are known for measuring the touch deltas (e.g., the measurable change (i.e., response) resulting from a touch) and from those measurements, determining the location of one or more touches, see, e.g., U.S. Pat. No. 9,019,224 entitled LOW LATENCY TOUCH SENSITIVE DEVICE, and U.S. Pat. No. 9,529,476 entitled FAST MULTI-TOUCH POST-PROCESSING, the disclosures of which are incorporated herein by this reference. Touch delta is usually expressed as a ratio in dB. Generally, the touch delta directly affects the signal to noise (SNR) for the system. In a typical capacitive touch sensor design, high touch deltas are desirable at the touch surface of the sensor. Generally, a touch delta would reflect a difference between a baseline response of a touch sensor and its response with a touch object (such as a finger or stylus) present. In the context of the above-identified patents, a touch delta would reflect a difference between a baseline response of a touch sensor at each given frequency and its response at those frequencies with a touch object (such as a finger or stylus) present.

Portions of a touch sensor—which may be conductive materials such as ITO or silver nano-wire—are embedded in, placed on, or integrated with a touch surface (such portions of a touch sensor may be referred to herein as e.g., touch sensor conductors, conductive elements or touch sensor antennas). Touch sensor conductors are typically placed in a grid of rows and columns, either the rows or columns may be stimulated with signals or energy, although in some embodiments, both the rows and columns are stimulated. In a typical touch application, spacing between the rows and spacing between the columns is generally uniform, and is often proposed in the range of 4 mm to 5 mm.

As used herein, driven conductors are sometimes referred to as drive lines, and the other are referred to as sense lines.

(In some touch sensors, the touch sensor conductors may act as drive lines and sense lines at the same time, see, e.g., U.S. patent application Ser. No. 14/216,791 entitled FAST MULTI-TOUCH NOISE REDUCTION, the disclosure of which is incorporated herein by this reference. Touch surfaces such as those described above include an array of touch regions or nodes formed at the crossing points between rows of drive lines and columns of sense lines. To sense touch on the touch surface, drive lines are stimulated causing them to capacitively couple with the crossing sense lines. Receivers measure the coupled signals on the crossing sense lines. In some implementations, coupled signals from nodes proximate to a touch decrease on the sense lines, and vice versa. It should be noted that the word touch as it is used herein does not require physical touch (e.g., actual contact), but only a nearing sufficient to create a measurable touch delta. In general, a touch sensitive device detects the position of touch deltas caused by a touch (i.e., a touch event) by correlating the receivers detecting the touch delta with a row-column position.

Although the rows and columns are identified as "crossing", the crossing is observed from a plan view. In general, the rows and columns do not touch, rather, they are in close proximity with each other and thus, can be capacitively coupled. In some implementations, the rows and columns are on separate layers. In some implementations, the rows and columns are on separate sides of a substrate. The rows and columns can be placed on the same layer, but can be bridged at each "crossing," requiring a large number of such bridges. As an example, typical spacing between the touch sensor conductors is between about 4 mm and 5 mm. Thus, on a typical smart-phone, there may be 20-30 rows and 10-20 columns, requiring between 200 and 600 bridges depending on the phone size and inter-conductor pitch.

In many instances, shielding may be required to separate row conductors from column conductors as they are being routed from the touch surface to, e.g., the drive circuit and sense circuit. In the case of generally rectangular touch surface, the rows (e.g., drive lines) must be routed from an edge that is at 90-degrees with respect to the edge from where the columns (e.g. sense lines) are routed. In view of the modern trend to reduce bezel size, attaching the rows and columns to the drive and sense circuits may require careful shielding and/or difficult or circuitous routing.

There is a need for a touch sensor that addresses these shortcomings and provides other benefits.

BRIEF SUMMARY OF THE INVENTION

It is an object of this disclosure to provide a touch sensor that addresses the above-described shortcomings of the prior art.

It is a further object of this disclosure to provide a touch sensor which can have drive and sense attachments from a single side (e.g., edge).

It is also an object of this disclosure to provide a touch sensor which can have drive lines and sense lines on the same layer with limited use of bridges.

It is yet another object of this disclosure to provide a touch sensor which can have drive and sense attachments from a single side (e.g., edge) and can have drive lines and sense lines on the same layer with limited use of bridges.

It is yet a further object of this disclosure to provide a touch sensor which can have drive and sense attachments from a single side (e.g., edge) can have drive lines and sense lines on the same layer without the use of bridges.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

FIG. 7A shows an example of a connector, (showing one layer in phantom) that may be employed in in connection with the sensor for detecting touch illustrated in FIG. 6.

FIGS. 7B and 7C show a front and rear view of the connector illustrated in FIG. 7A.

DETAILED DESCRIPTION

The present application contemplates various embodiments of touch sensors designed for human-computer or human-machine interaction applications. The present application also contemplates various configurations and orientations of touch sensor conductors to sense human-computer or human-machine interaction when combined with touch sensing apparatus. While the touch sensor conductor configurations are suited to use with frequency-orthogonal signaling techniques (see, e.g., U.S. Pat. Nos. 9,019,224 and 9,529,476, and U.S. patent application Ser. No. 14/216,791), it may be used with other signal techniques including scanning or time division techniques, and/or code division techniques.

Figure 1:
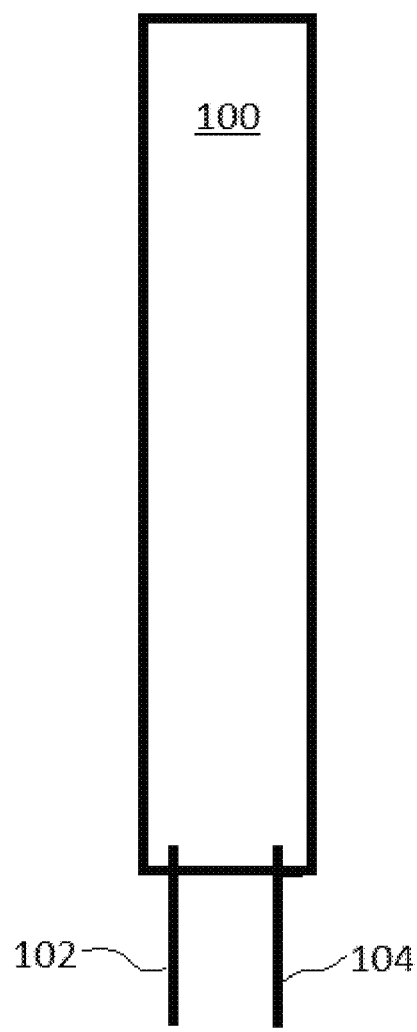
FIG. 1 shows a high-level illustration of an embodiment of a slide sensor.

FIG. 1 shows a high-level illustration of an embodiment of a slide sensor 100 made in accordance with the present invention. Slide sensor 100 comprises at least two touch sensor conductors 102, 104, one to act as a drive line and the other to act as a sense line. In an embodiment, touch sensor conductor 102 is employed as a drive line, and touch sensor conductor 104 is used as a sense line. In an embodiment, the reverse holds, and touch sensor conductor 102 is employed as a sense line, while touch sensor conductor 104 is used as a drive line. Regardless of that orientation, to operate the slide sensor 100, drive circuitry (not shown) generates a drive signal to stimulate the drive line, and a sensing circuit (not shown) senses a capacitively coupled response. A baseline response is sensed (by definition) when no touch is present on the surface of slide sensor 100. (As discussed above, the term touch, as used herein, does not require contact, but rather, refers to contact and near touches that affect the capacitive coupling between a drive line and a sense line.) When a touch occurs, a touch delta can be identified. In other words, when the touch occurs the capacitive coupling between a drive line and a sense line changes. In an embodiment, the touch delta is positive. In an embodiment, the touch delta is negative, The touch delta of the slide sensor 100 differs depending on the location along the slide sensor 100 (i.e., from and away from the location where the touch sensor conductors are visible) of the touch object, i.e., the object affecting the capacitive coupling between the drive line and the sense line. (As used herein, the term touch object will be used to refer to the object affecting the capacitive coupling between the drive line and the sense line.) In an embodiment, the magnitude of the touch delta is different when a touch object is at one end of the slide sensor than it is when the same touch object is at the other end of the slide sensor. In an embodiment, the magnitude of the touch delta is greater when the touch object is at one end of the slide sensor and lower when it is at the other end of the slide sensor. In an embodiment, the magnitude of the touch delta changes from a high or maximum when the touch object is at one end of the slide sensor and a minimum or low when the touch object is at the other end of the slide sensor 100. In an embodiment, the touch delta changes as a touch object slides along the slide sensor 100 lengthwise (e.g., towards and away from the touch sensor conductor connections shown in FIG. 1). In an embodiment, the touch delta changes in a predictable manner as a touch object slides along the slide sensor 100 lengthwise. In an embodiment, because the touch delta changes with lengthwise position, the magnitude of the touch delta can be used to infer position.

Although the slide sensor 100 is shown having two touch sensor conductors accessible for connection at one end (i.e., edge) of the unit, it should be noted that in an embodiment, such access points (e.g., points of connection for drive and sense circuitry) may be placed on opposite ends of the slide sensor 100. In an embodiment, the access points may be made at any location on the slide sensor 100, however, as will be apparent to one of skill in the art in view of this disclosure, in routing leads to or from the touch sensor conductors, care needs to be taken to ensure that the routing does not cause interference with the sensor signal (e.g., with the sensed response). In an embodiment, shielding is used to prevent interference due to the location or position of routed leads used to connect a touch sensor conductor to a point where it can be accessed.

The touch sensor conductor configurations disclosed herein can be produced using any technique to place the touch sensor conductors upon a front and/or back surface or within a substrate. Techniques familiar to those of skill in the art can be used to place, configure or orient the touch sensor conductors, including, e.g., etching, photo-lithography, chemical vapor deposition, physical vapor deposition, chemical-mechanical planarization, or oxidation, to name several of common methods. Many different substrates are suitable for supporting touch sensor conductors. In an embodiment, a rigid or flexible printed-circuit board is used to support the touch sensor conductors. In an embodiment, flexible plastics or other deformable substrates can be used to support the touch sensor conductors.

Moreover, in each of the touch sensor conductor configurations disclosed herein, one or more of the touch sensor conductors may be placed on opposing sides of the supporting substrate from one or more of the other touch sensor conductors. Thus, in an embodiment, both touch sensor conductors may be on one side of a substrate. Alternatively, in an embodiment, one or more touch sensor conductors may be on one side of a substrate, while one or more other touch sensor conductors is on the opposing side of the substrate. In another embodiment, one or more of the touch sensor conductors are on one side of a relatively thin substrate, and one or more of the other touch sensor conductors are on a separate substrate, the two substrates being stacked with the relatively thin substrate above the other substrate. Other configurations will be recognized by persons of skill in the art in view of this disclosure without departing from the spirit and scope of the description herein, which is only intended to be limited by the annexed claims.

Figure 2:
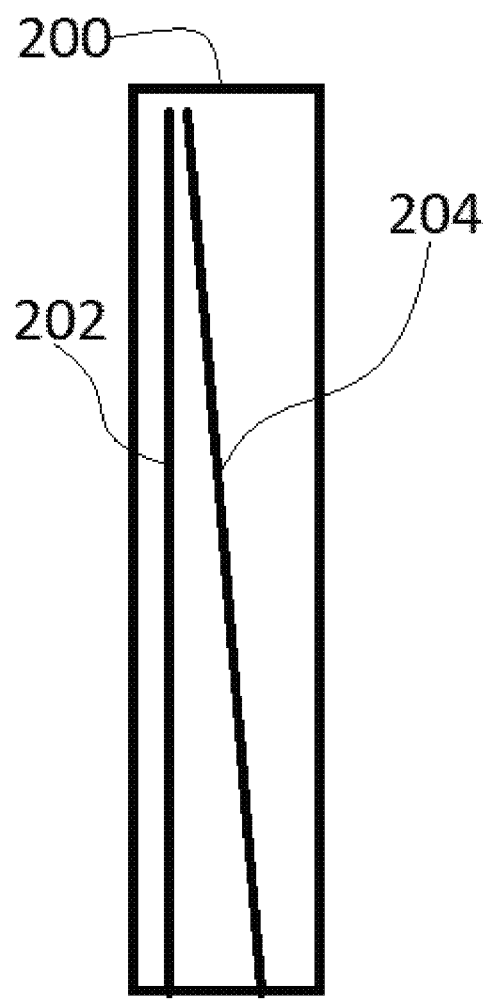
FIG. 2 shows a schematic illustration of one embodiment of a slide sensor.

FIG. 2 shows a schematic illustration of one embodiment of a slide sensor 200. In the illustration, touch sensor conductors 202, 204 are visible in the slide sensor 200. In the illustrated embodiment, the touch sensor conductors 202, 204 are not parallel to each other, but rather, are arranged in a manner that the relationship between them changes along the length of the slide sensor 200. In an embodiment, the touch sensor conductors 202, 204 are oriented such that any given linear position along the length of the slide sensor 200 (i.e., up and down on the illustrated figure) corresponds to a different distance between the touch sensor conductors 202, 204. In an embodiment, the touch sensor conductors 202, 204 are oriented such that any given linear position along the length of the slide sensor 200 corresponds to a different touch delta for a given touch object at that linear position. Although one touch sensor conductor 202 is shown as a straight line parallel to the lengthwise direction of the slide sensor 200, this orientation is not necessary or required. In an embodiment, touch sensor conductor 202 is not straight. In an embodiment, touch sensor conductor 202 is curved. In an embodiment, touch sensor conductor 202 is not oriented parallel to the lengthwise direction of the slide sensor 200. In an embodiment, the touch sensor conductors 202, 204 are oriented in a narrow "V" formation. In an embodiment, the touch sensor conductors 202, 204 are oriented in a narrow inverted "V" formation. In an embodiment both touch sensor conductors 202, 204 are curved, and are oriented such that any given linear position along the length of the slide sensor 200 corresponds to a different touch delta for a given touch object at that linear position.

In an embodiment, both touch sensor conductors 202, 204 are curved, and are oriented such that any given X, Y position on the touch surface of the slide sensor 200 corresponds to a different touch delta for a given touch object at that position. In an embodiment where both touch sensor conductors 202, 204 are curved, a first touch sensor conductor may be configured in a space-filling curve, (e.g., a Hilbert Curve) and another touch sensor is configured to have a continuously variable distance from the first curve along its length (e.g., starting very close, and ending further away). In an embodiment using two curved touch sensor conductors, a 1-dimensional measurement along the length of the first curve can be used to derive 2-dimensional measurements on the sensor. In an embodiment, the first curve could be any Peano curve. In an embodiment, the first curve could be a Gosper curve. In an embodiment, the first curve could be a Moore curve. In an embodiment, the first curve could be a Serpinski curve. It will be apparent to a person of skill in the art in view of this disclosure that with respect to a space-filling curve, there are convenient mathematics for moving between a 1-dimension position on the curve to a 2D position in the space that it is filling.

Although the slide sensor 200 is shown having two touch sensor conductors accessible for connection at one end (i.e., edge) of the unit, it should be noted that in an embodiment, such access points (e.g., points of connection for drive and sense circuitry) may be placed on opposite ends of the slide sensor 200. In an embodiment, the access points may be made at any location on the slide sensor 200, however, as will be apparent to one of skill in the art in view of this disclosure, in routing leads to or from the touch sensor conductors, care needs to be taken to ensure that the routing does not cause interference with the sensor signal (e.g., with the sensed response). In an embodiment, shielding is used to prevent interference due to the location or position of routed leads used to connect a touch sensor conductor to a point where it can be accessed.

It should be noted that sensing areas (and or substrates) may come in various shapes and sizes, thus, the "one edge" description may not apply as clearly to some cases. It will be apparent to one of skill in the art in view of this disclosure that due to the novel configuration of the sensors described herein, electrical access to the conductors can be made in substantially less than 180 degrees of a sensing area as measured from a centroid of the sensing area. This differs from a traditional row-column sensor that would require electrical access from almost an entire 180 degrees. In an embodiment, electrical access to the conductors can be made in less than 120 degrees of a sensing area as measured from a centroid of the sensing area. In an embodiment, electrical access to the conductors can be made in less than 90 degrees of a sensing area as measured from a centroid of the sensing area. In an embodiment, electrical access to the conductors can be made in less than 45 degrees of a sensing area as measured from a centroid of the sensing area.

Figure 3:
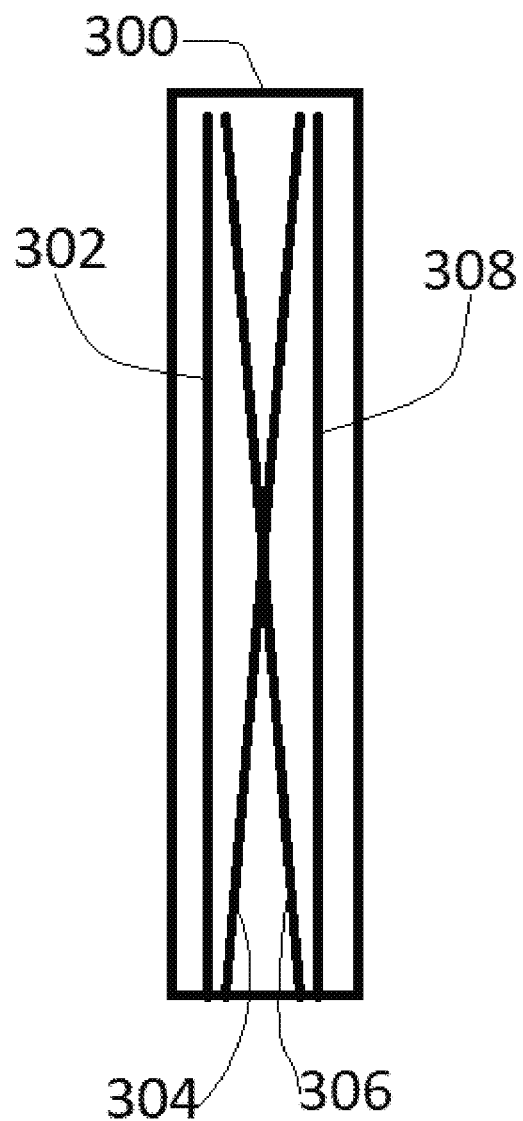
FIG. 3 shows a schematic illustration of another embodiment of a slide sensor.

FIG. 3 shows a schematic illustration of another embodiment of a slide sensor 300. Slide sensor 300 comprises a total of four touch sensor conductors 302, 304, 306, 308. In an embodiment, two of the four touch sensor conductors 302, 308 are used as drive lines while the other two 304, 306 are used as sense lines. The reverse is equally applicable. In an embodiment, a bridge is used to conductively separate the two crossing touch sensor conductors 304, 306 In an embodiment, the two crossing touch sensor conductors are on separate layers. In an embodiment, the two crossing touch sensor conductors are on the front and back of the same substrate. the two crossing touch sensor conductors are on separate substrates. The non-crossing touch sensor conductors 302, 308 may be, but need not be, on the same or different layers or on the same or different substrates. As discussed above, in an embodiment, the touch sensor conductors may be or include curves instead of being solely straight lines. In order to operate as part of a touch sensor, the touch sensor conductors are configured to permit drive or sense circuitry (not shown) to be attached thereto.

In the embodiment shown in FIG. 3, all of the touch sensor conductors can be accessed on a single edge of the slide sensor 300. This permits the slide sensor 300 to be used in applications providing very small bezel space on three of the four sides. Although the slide sensor 300 is shown having its touch sensor conductors accessible for connection at one end of the unit, it should be noted that in an embodiment, such access points (e.g., points of connection for drive and sense circuitry) may be placed on opposite ends of the slide sensor 300. In an embodiment, the access points may be made at any location on the slide sensor 300, however, as will be apparent to one of skill in the art in view of this disclosure, in routing leads to or from the touch sensor conductors, care needs to be taken to ensure that the routing does not cause interference with the sensor signal (e.g., with the sensed response).

In the illustrated embodiment, the non-crossing touch sensor conductors 302, 308 are parallel to each other, while the crossing touch sensor conductors 304, 306 are not. Through this configuration, and provided that the drive lines have orthogonal signals, the relationship between the non-crossing touch sensor conductors 302, 308 and the crossing touch sensor conductors 304, 306 changes along the length of the slide sensor 300. As discussed above, the signals can be orthogonal in time, frequency and/or code. In an embodiment, again employing orthogonal signals on multiple drive lines, the touch sensor conductors 302, 304, 306, 308 are oriented such that any given linear position along the length of the slide sensor 300 corresponds to a unique distance between each drive line and each sense line. In an embodiment, again employing orthogonal signals on multiple drive lines, the touch sensor conductors 302, 304, 306, 308 are oriented such that any given linear position along the length of the slide sensor 300 corresponds to a unique touch delta between each drive line and each sense line.

In an embodiment, the two drive lines are stimulated at separate times. In an embodiment, the two drive lines are stimulated at alternating times so that when one of the drive lines is being stimulated, the other is not, and vice versa. This permits the drive lines to use the same stimulation signal.

Although the non-crossing touch sensor conductors 302, 304 are shown as a straight line parallel to the lengthwise direction of the slide sensor 300, this orientation is not necessary or required. In an embodiment, one or more of the non-crossing touch sensor conductors 302, 304 are not straight. In an embodiment, touch sensor conductor one or more of the non-crossing touch sensor conductors 302, 304 are curved.

In an embodiment, only one of the non-crossing touch sensor conductors is required. In other words, in an embodiment, a slide sensor 300, operates with three touch sensor conductors 302, 304, 306. In an embodiment, only one of the crossing touch sensor conductors is required. In other words, in an embodiment, a slide sensor 300, operates with three touch sensor conductors 302, 304, 308. A three-touch sensor conductor slide sensor 300 may use one or two drive lines, and one or two sense lines.

Thus, as one of many examples of such a three-touch sensor conductor slide sensor 300, non-crossing touch sensor conductor 302 is used as a drive line, and crossing touch sensor conductors 304, 306 are used as sense lines. Distance between drive line and each sense line is inversely affected by movement up and down the sliding sensor 300. In such an embodiment, coupling between drive line and each sense line may be inversely affected by movement up and down the sliding sensor 300, that is, that when the coupling between drive line 302 and sense line 304 increases (e.g., when a touch object is lower on the illustration and thus touch sensor conductors 302, 304 are close together), coupling between drive line 302 and sense line 306 decreases (e.g., when a touch object is lower on the illustration and touch sensor conductors 302, 306 are farther apart).

As another illustration of a three-touch sensor conductor slide sensor 300, non-crossing touch sensor conductor 302 is used as a sense line, and crossing touch sensor conductors 304, 306 are used as drive lines. In such an embodiment, for a touch object location towards the bottom of the sliding sensor 300 (as oriented in the illustration) a larger touch delta would be expected to be seen on the sense line 302 for the stimulation signal on drive line 304 as compared to the stimulation signal on drive line 306.

As a further illustration of a three-touch sensor conductor slide sensor 300, non-crossing touch sensor conductors 302, 308 are used as sense lines, and crossing touch sensor conductor 304 is used as a drive line. In such an embodiment, for a touch object location towards the bottom of the sliding sensor 300 a larger touch delta would be expected to be seen on the sense line 302 as compared to what is seen on sense line 308 for the stimulation signal on drive line 304.

In an embodiment, sensor 300 is implemented such that at least crossing touch sensor conductors 306, 306 are not on the same layer or are conductively isolated by a bridge; two sense lines 304, 306 are positioned straight vertical on the left and right, and two drive lines 304, 306 positioned on the diagonals. In such an embodiment wherein non-crossing touch sensor conductors 302, 308 are sense lines and crossing touch sensor conductors 304, 306 are drive lines, and wherein two touch sensor conductors 302, 304 are on one layer, while the other two touch sensor conductors 306, 308 are on another layer, a single-sided-drive sensor in the form of a slider is configured such that:

(i) when touched at its top,
1) the touch delta on sense line 302 is greater with respect to drive line 306, and lower with respect to drive line 304;
2) the touch delta on sense line 308 is lower with respect to drive line 306, and greater with respect to drive line 304;
(ii) when touched at its middle,
1) the touch delta on sense line 302 is about the same with respect to drive line 306 and drive line 304;
2) the touch delta on sense line 308 is about the same with respect to drive line 306 and drive line 304;
(iii) when touched at the bottom,
3) the touch delta on sense line 302 is lower with respect to drive line 306, and greater with respect to drive line 304;
4) the touch delta on sense line 308 is greater with respect to drive line 306, and lower with respect to drive line 304;

This result can be accessed from a single edge. More generally, the absolute touch delta of the two sense lines 302, 308 can be used by touch detection logic to determine how close a touch is from the right and left, and the difference in the deltas can be used to determine where the touch is on the vertical axis from bottom to top.

Figure 4:
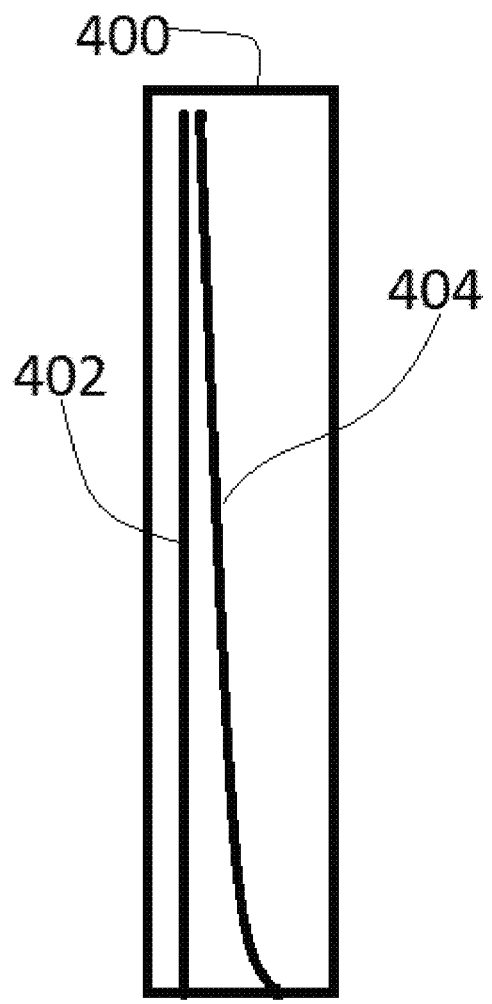
FIG. 4 shows a schematic illustration of yet another embodiment of a slide sensor.

FIG. 4 shows a schematic illustration of yet another embodiment of a two-touch sensor conductor 402, 404 slide sensor 400. The embodiment illustrated in FIG. 4 is similar to the one illustrated in FIG. 2, however, one of the two touch sensor conductors 404 in slide sensor 400 is curved. In an embodiment, a second order curve may be used. In an embodiment, a curve may be imparted to one or more of the touch sensor conductors 402, 404. In an embodiment, one or more of the touch sensor conductors 402, 404 are curved to affect the touch delta that is sensed on the sense line by the sensing circuitry (not shown). In an embodiment, the effect of a touch object is generally reduced with the square of the distance between the capacitively coupled touch sensor conductors. Thus, configuring touch sensor conductors such that their spacing is (or approximates) a second order curve may provide a more linear touch delta response as a touch object is moved along the length of the slide sensor 400. In an embodiment, one or more of the touch sensor conductors are curved so that the sensed signals are more linearly related to the position of touch. In an embodiment, one or more of the touch sensor conductors are curved to cause sensed signals to be linearly related to the position of touch.

Figure 5:
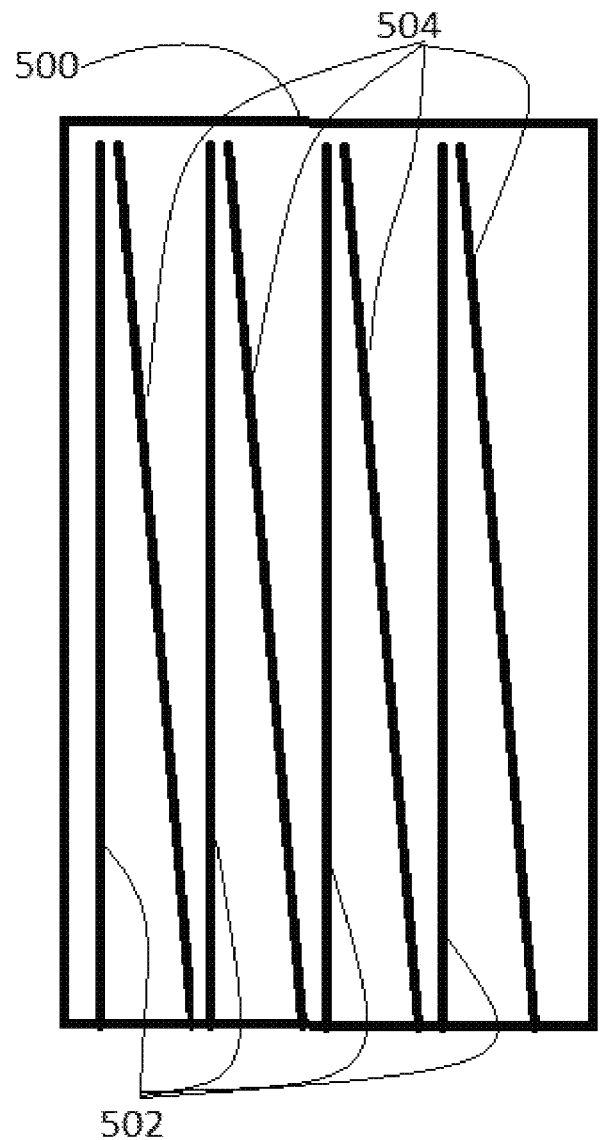
FIG. 5 shows a schematic illustration of one embodiment of a sensor for detecting touch.

Slide sensors 100, 200, 300 and 400 can be used in a horizontal series to provide X positioning. Turning to FIG. 5 an embodiment of a sensor for detecting touch is schematically illustrated. The senor 500 comprises two groups of touch sensor conductors 502, 504. The two groups of touch sensor conductors 502, 504 are shown as straight lines, but as discussed above, may be curved, and indeed, may be curved to increase the linearity of response (e.g., touch delta) with respect to a drive line/sense line pair. In an embodiment, one of the two groups of touch sensor conductors 502, 504 is employed as drive lines, while the other group of touch sensor conductors 502, 504 is employed as sense lines.

In an embodiment, the vertical/diagonal pairs of touch sensor conductors shown in FIG. 5 may be configured, and behave, as described in connection with FIG. 2. In an embodiment, the vertical/diagonal/vertical triplets of touch sensor conductors shown in FIG. 5 may be configured, and behave, as described in connection with a three-touch sensor conductor embodiment described in connection with FIG. 3. It should be noted that the embodiment shown in FIG. 5 arbitrarily contains an even number of touch sensor conductors, but could equally well have an odd number of touch sensor conductors, e.g., having an additional vertical touch sensor conductor to the right of the last touch sensor conductor shown.

The configuration shown in FIG. 5, and variations on that configuration that will be apparent to one of skill in the art in view of this disclosure, can be used to sense both X and Y position across the touch sensor 500. In an embodiment, the spacing between the drive lines in sensors according to the present disclosure may, but need not, fall within the range of 4 mm to 5 mm. In an embodiment, the spacing between the drive lines in sensors according to the present disclosure may be closer than 4 mm. In an embodiment, the spacing between the drive lines in sensors according to the present disclosure may exceed 5 mm. Similarly, in an embodiment, the spacing between the sense lines in sensors according to the present disclosure may, but need not, fall within the range of 4 mm to 5 mm. In an embodiment, the spacing between the sense lines in sensors according to the present disclosure may be closer than 4 mm. In an embodiment, the spacing between the sense lines in sensors according to the present disclosure may exceed 5 mm.

Touch location in the vertical ("Y") direction (as shown in the illustration) are identified as discussed above. Touch location in the horizontal ("X") direction is detected as a horizontal shift occurs in a touch object. Consider, for example a finger proximate to the touch sensor 500 in the upper left corner, and moving horizontally toward the upper right corner: when in the upper left corner a given magnitude touch delta will be seen between the first pair of drive and sense lines (e.g., the leftmost illustrated conductor and the second-to-left illustrated conductor); as the finger moves to the right, the magnitude of that touch delta will decrease, as the magnitude of the touch delta on the next pair of drive and sense lines increases (e.g., between the third-to-left conductor and the fourth-from-the-left illustrated conductor). This will continue across the panel. The foregoing analysis ignores the additional information that can be gleaned from the interaction between the second and third conductors, and the fourth and fifth conductors. In an embodiment, these touch deltas would be weaker near the top of the panel, but nonetheless, can provide valuable information to be used in locating the touch object. In an embodiment, where drive lines are driven with orthogonal signals and sense circuitry can sense an amount of each orthogonal signal that is present on each sense line, it will be apparent to a person of skill in the art in view of this disclosure that the sensed information from touch sensor 500 is sufficient to compute an X and a Y location for a touch object despite the lack of any nodes (i.e., crossing points between drive lines and sense lines).

The configuration shown in FIG. 5, and variations on that configuration that will be apparent to one of skill in the art in view of this disclosure, can be provided with all of the connections to drive and sense circuitry on one edge, thus permitting use in designs with edge constraints on at least three sides. As will be discussed in more detail below, care must be taken to shield the off-touch sensor drive lines from the off-touch sensor sense lines so that one does not affect the other. In an embodiment, the connections for one group of touch sensor conductors 502 are provided on one edge, while the connections for the other group of touch sensor conductors 504 are provided on the other edge. Such a configuration may reduce or eliminate shielding requirements. Moreover, in an embodiment, such a configuration may be used to keep stimulating circuits physically separate from sensing circuits.

Figure 6:
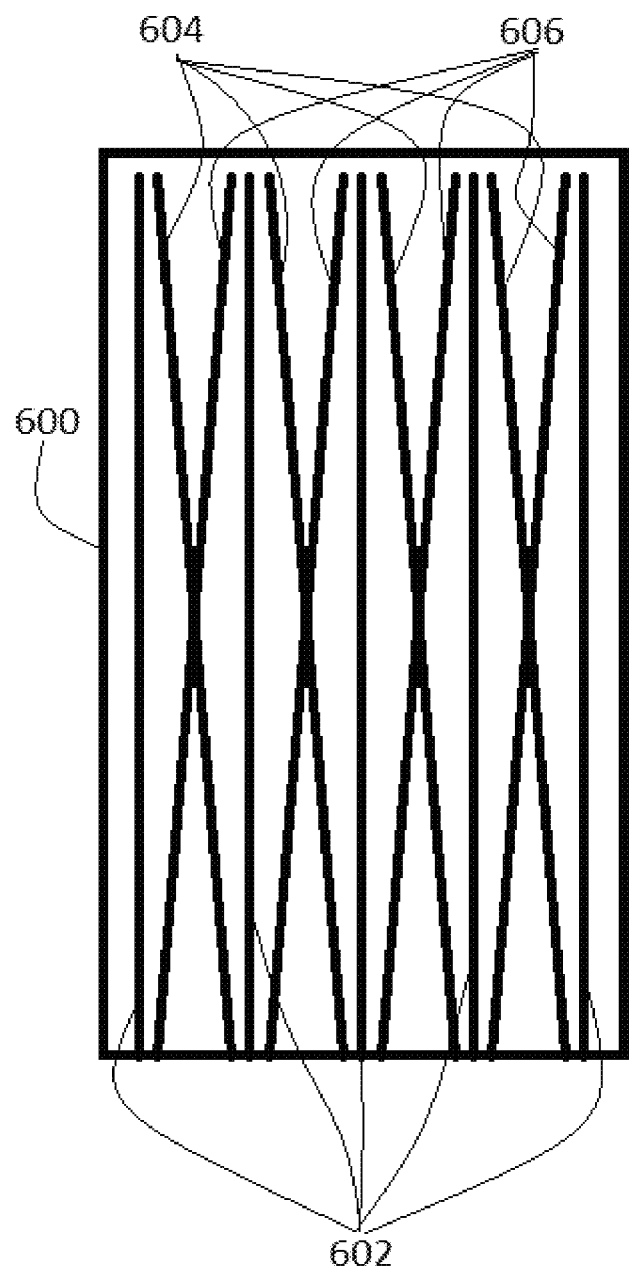
FIG. 6 shows a schematic illustration of another embodiment of a sensor for detecting touch.
Figure 8:
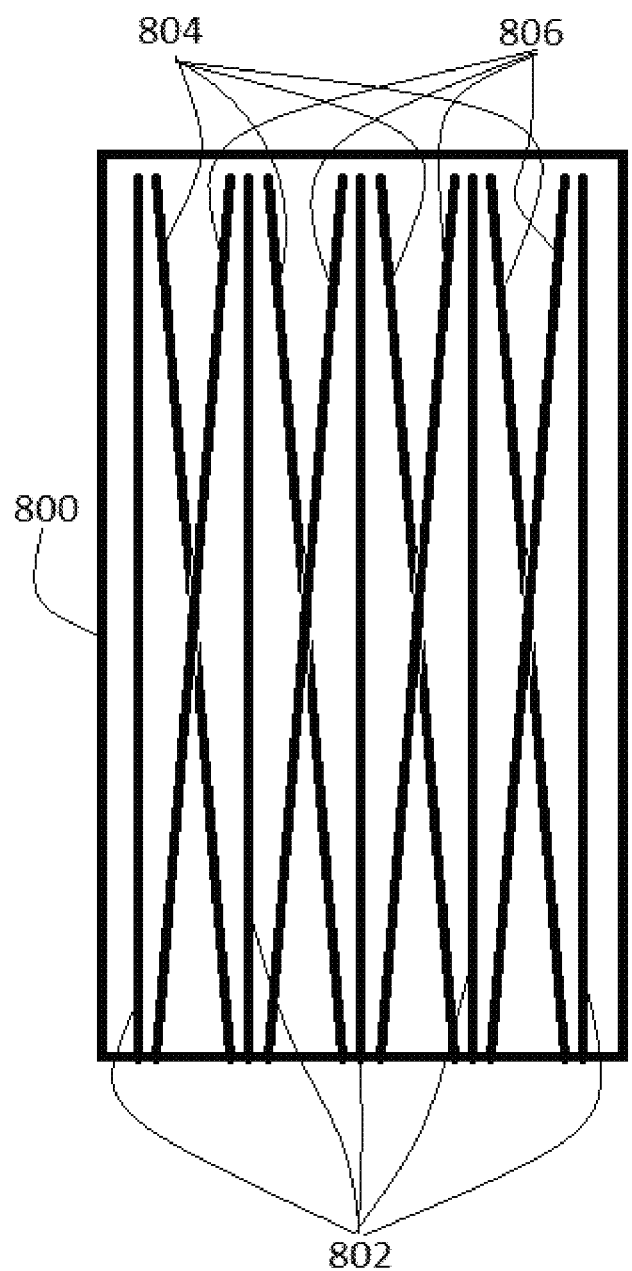
FIG. 8 shows a schematic illustration of yet another embodiment of a sensor for detecting touch.

FIG. 6 show a schematic illustration of another embodiment of a sensor for detecting touch. Sensor 600, like sensor 500, comprises two groups of touch sensor conductors 602, 604, like 502, 504. The embodiment illustrated in FIG. 6 differs from the FIG. 5 embodiment in that it additional contains a third group of touch sensor conductors 606. In an embodiment, crossing conductors 604, 606 of sensor 600 are on separate layers (which may be on opposite sides of, or on and/or within the same substrate, or which may be on and/or within two separate substrates). In an embodiment (see FIG. 8), crossing conductors 804, 806 of sensor 800 are on the same layer, but separated by a bridge. (In an embodiment, the crossing conductors 804, 806 are made from ITO (indium tin oxide) and ITO bridges are used to separate the crossing conductors 804, 806 where they cross.

Turning back to FIG. 6, at least one of the three groups of touch sensor conductors 602, 604, 608 must be used as drive lines, and at least one of the three groups of touch sensor conductors must be used as sense lines; the third group of touch sensor conductors in touch sensor 600 can be either drive or sense lines.

In an embodiment, both groups of crossing touch sensor conductors 804, 806 are employed as sense lines, and the group of non-crossing touch sensor conductors are employed as drive lines. In an embodiment, both groups of crossing touch sensor conductors 804, 806 are employed as drive lines, and the group of non-crossing touch sensor conductors are employed as sense lines. In an embodiment, one group of crossing touch sensor conductors 804 is employed as sense lines, and the group of non-crossing touch sensor conductors and the other group of crossing touch sensor conductor are employed as drive lines. In an embodiment, one group of crossing touch sensor conductors 804 is employed as drive lines, and the group of non-crossing touch sensor conductors and the other group of crossing touch sensor conductor are employed as sense lines. Regardless of the selection of drive and sense lines, the techniques as described above can resolve X and Y coordinates of a touch object. In an embodiment, the sense circuitry receives sufficient information from the sense lines to resolve X and Y coordinates of multiple touch objects.

In an embodiment, the allocation of drive line and sense line is dynamic, and changes over time. Thus, for example, referring to the three groups of touch sensor conductors as A, B and C, and using the "prime" designation (e.g., A') to show the drive lines, in an embodiment, for a first scan or frame, the groups are A', B C, for a second scan or frame, the groups are A, B', C, and for a third scan or frame, the groups are A, B, C'—in an embodiment, this sequence is repeated. In another embodiment, for a first scan or frame, the groups are A', B' C, for a second scan or frame, the groups are A, B', C', and for a third scan or frame, the groups are A', B, C'. Again, in an embodiment, the sequence is repeated.

The configuration shown in FIG. 6, and variations on that configuration that will be apparent to one of skill in the art in view of this disclosure, can be provided with all of the connections to drive and sense circuitry on one edge, thus permitting use in designs with edge constraints on at least three sides. As will be discussed in more detail below, care must be taken to shield the off-touch sensor drive lines from the off-touch sensor sense lines so that one does not affect the other. In an embodiment, the connections for one or two groups of touch sensor conductors are provided on one edge, while the connections for the other one or two groups of touch sensor conductors are provided on the other edge. In an embodiment, touch sensor conductors used as drive lines share a common edge for connection, and touch sensor conductors used as sense lines share a common edge for connection. In an embodiment, the common edge used for drive lines and the common edge used by sense lines are different edges. In an embodiment, the common edge used for drive lines and the common edge used by sense lines are opposite edges. Such a configuration may reduce or eliminate shielding requirements. Moreover, in an embodiment, such a configuration may be used to keep stimulating circuits physically separate from sensing circuits.

FIG. 7A shows an example of a connector 700 (portions made see-thru for illustrative purposes) that may be employed in connection with, e.g., the sensor 600 for detecting touch illustrated in FIG. 6. FIG. 7B shows the connector 700 and the leads 702 and terminals 704 on one side of the connector, while FIG. 7C shows connector 700 and the leads 706 and terminals 708 on the other side of the connector. The leads 706 and connections 708 seen in FIG. 7C are shown in phantom in FIG. 7A. In an embodiment, connector 700 is used in combination with the sensor 600. In an embodiment, leads 702 connect to the non-crossing touch sensor conductors 602, and leads 706 connect to the crossing touch sensor conductors 604, 606. Connector 700 is suitable for use as part of a connection between the touch sensor conductors 602, 604, 606 of the sensor 600 and drive and sense circuitry, and because the leads 702 are situated to connect to touch sensor conductors 602 and the leads 706 are situated to connect to touch sensor conductors 604, 606, connector 700 is particularly suited for an embodiment where: (i) non-crossing touch sensor conductors 602 are drive lines and the crossing touch sensor conductors 604, 608 are sense lines; or (ii) non-crossing touch sensor conductors 602 are sense lines and the crossing touch sensor conductors 604, 608 are drive lines. Grounding 710 separates the front and back of the connector to mitigate mixing or interference between signals on leads 702 and signals on leads 706.

When connector 700 is used in combination with the sensor 600, the connector 700 routes an electrical connection from non-crossing touch sensor conductors 602 to terminals 704, and an electrical connection from crossing touch sensor conductors 604, 606 to terminals 708. In an embodiment, the terminals 704, 708 provide an edge connector for easy plug-in operation. In an embodiment, drive circuitry and sense circuitry are available on an edge connection (not shown) that mates with the connector 700.

Figure 9:
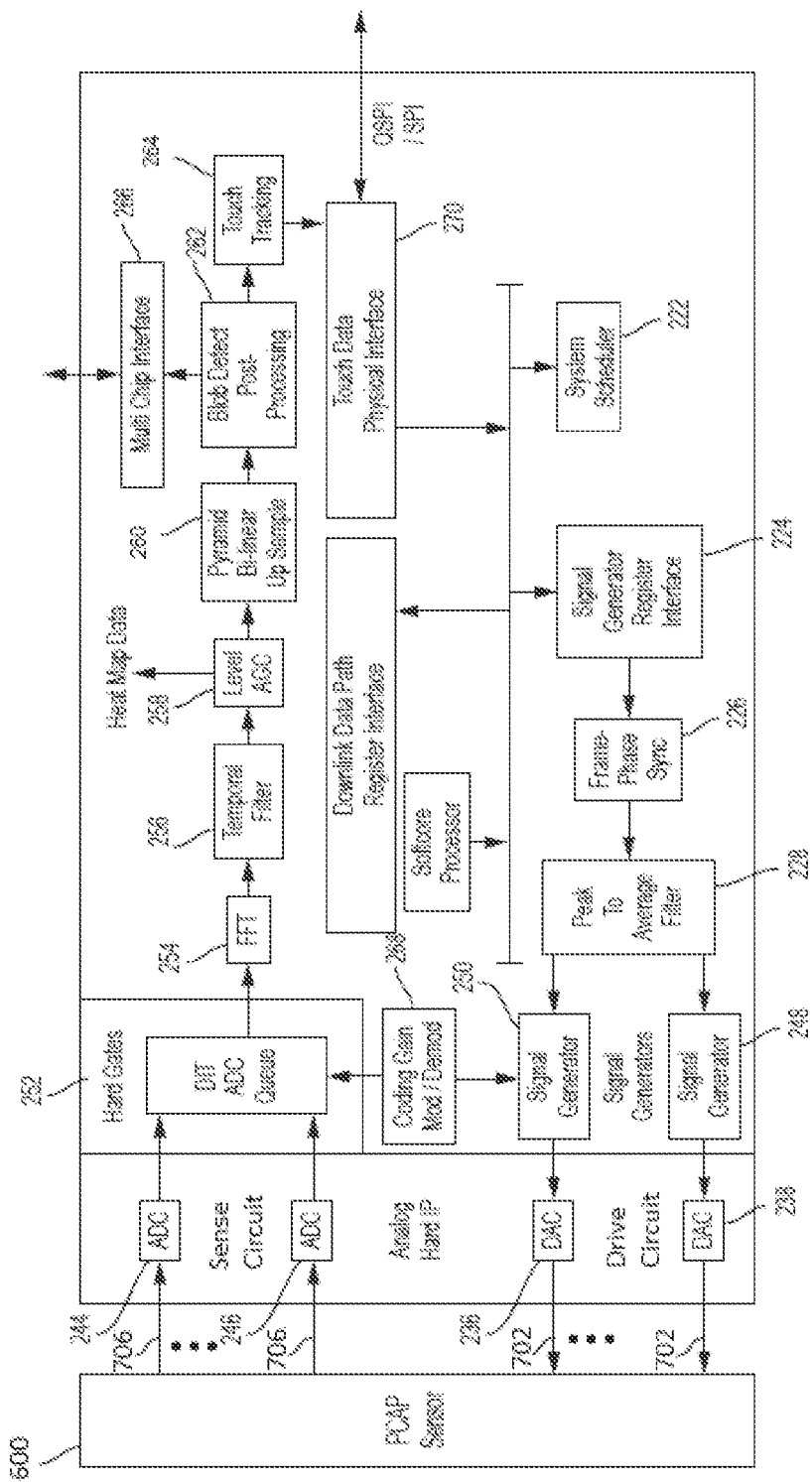
FIG. 9 shows a functional block diagram of an illustrative frequency division modulated touch sensitive device.

FIG. 9 provides a functional block diagram of an illustrative frequency division modulated touch detector. Sensor 600 (see FIG. 6) is shown schematically. In an embodiment, stimulation signals are transmitted to drive lines 702 of the touch sensor 230 via drive circuitry including digital-to-analog converters (DAC) 236, 238 and time domain received signals are sampled from the sense lines 706 by sense circuitry comprising analog-to-digital converters (ADC) 244, 246. In an embodiment, the transmitted signals are time domain signals generated by signal generators 248, 250 which are operatively connected to the DAC 236, 238. In an embodiment, a Signal Generator Register Interface block 224 operatively connected to the System Scheduler 222, is responsible for initiating transmission of the time domain signals based on a schedule. In an embodiment, Signal Generator Register Interface block 224 communicates with Frame-Phase Sync block 226, which causes Peak to Average Filter block 228 to feed Signal Generator blocks 248, 250 with data necessary to cause the signal generation.

In an embodiment, changes in the received signals are reflective of touch events at the touch sensor 600 (e.g., touch delta), noise and/or other influences. In an embodiment, the time domain received signals are queued in hard gates 252, before they are converted into the frequency domain by FFT block 254. In an embodiment, a Coding Gain Modulator/Demodulator block 268 provides bidirectional communications between the Signal Generator blocks 248, 250 and hard gates 252. In an embodiment, a temporal filter block 256 and level automatic gain control (AGC) block 258 are applied to the FFT block 254 output. In an embodiment, the AGC block 258 output is used to prove heat map data and is fed to UpSample block 260. In an embodiment, UpSample block 260 interpolates the heat map to produce a larger map in an effort to improve accuracy of Blob Detection block 262. In an embodiment, up sampling can be performed using a bi-linear interpolation. In an embodiment, Blob Detection block 262 performs post-processing to differentiate targets of interest. In an embodiment, Blob Detection block 262 output is sent to Touch Tracking block 264 to track targets of interest as they appear in consecutive or proximal frames. In an embodiment, Blob Detection block 262 output components can also be sent to a multi-chip interface 266 for multi-chip implementations. In an embodiment, from the Touch Tracking block 264, results are sent to the Touch Data Physical Interface block 270 for short distance communication via QSPI/SPI.

In an embodiment, there is one DAC per channel. In an embodiment, each DAC has a signal emitter that emits a signal induced by the signal generator. In an embodiment, the signal emitter is driven by analog. In an embodiment, the signal emitter can be a common emitter. In an embodiment, signals are emitted by a signal generator, scheduled by the system scheduler, providing a list of digital values to the DAC. Each time the list of digital values is restarted, the emitted signal has the same initial phase.

In an embodiment, the frequency division modulated touch detector (absent the touchpad sensor) is implemented in a single integrated circuit. In an embodiment, the integrated circuit would have a plurality of ADC inputs and a plurality of DAC outputs. In an embodiment, the integrated circuit would have 36 ADC inputs and 64 orthogonal DAC outputs. In an embodiment, the integrated circuit is designed to cascade with one or more identical integrated circuits, providing additional signal space, such as 128, 192, 256 or more simultaneous orthogonal DAC outputs. In an embodiment, the ADC inputs are capable of determining a value for each of the DAC outputs within the signal space of the orthogonal DAC outputs, and thus, can determine values for DAC outputs from cascaded ICs as well as DAC outputs on the IC where the ADC resides.

In an embodiment such as that shown in FIG. 9, because the touch detection logic is now looking, for example, for 4 bins present per receiver, the beat Vpp is fairly manageable, and the overall baseline signal in the FFT increases very substantially. Furthermore, the overall sensor can run at a much higher baseline signal per transmitter than previous sensors.

Because the touch detection logic is looking for a differential signal, it may be possible in a particular application to provide some common mode rejection, perhaps eliminating the effect of some common mode noise sources. The effectiveness of such common mode rejection for a particular application depends at least in part upon how noise effects the FFT magnitudes.

Throughout this disclosure, the terms "touch," "touches," or other descriptors may be used to describe events or periods of time in which a user's finger, a stylus, an object or a body part is detected by a sensor. In some embodiments, these detections occur only when the user is in physical contact with a sensor, or a device in which it is embodied. In other embodiments, the sensor may be tuned to allow the detection of "touches" or "contacts" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors.

As used herein, ordinal words such as first and second when used to identify unnumbered objects are merely used to distinguish between those objects, and not intended to create an order of the objects or otherwise limit the objects they are used to identify.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

The invention claimed is:

1. A touch sensor comprising:
   substrate having a sensing area and a first, second and third conductive element, wherein each of the first, second and third conductive element is either a sense line or a drive line;
   the first and the second conductive elements disposed on the substrate such that at least a portion of each of the first and the second conductive elements are within the sensing area, and being arranged such that for any two given points on the first conductive element within the sensing area, the nearest point to each on the second conductive element within the sensing area is a different distance away;
   the third conductive element being disposed on the substrate such that at least a portion of the third conductive element is within the sensing area, and being arranged such that the third conductive element crosses the second conductive element, and is conductively isolated therefrom;
   the first and the third conductive elements being arranged such that for any two given points on the first conductive element within the sensing area, the nearest point to each on the third conductive element within the sensing area is a different distance away.

2. The touch sensor claimed in claim 1, wherein the substrate has a first edge, and the first, second and third conductive elements are electrically accessible on the first edge.

3. The touch sensor claimed in claim 1, wherein the first, second and third conductive elements are all electrically accessible within 120 degrees of the sensing area as measured from a centroid of the sensing area of the substrate.

4. The touch sensor claimed in claim 1, wherein the first, second and third conductive elements are all electrically accessible within 45 degrees of the sensing area as measured from a centroid of the sensing area of the substrate.

5. The touch sensor claimed in claim 1, wherein the first conductive element is a drive line, and the second and third conductive elements are sense lines.

6. The touch sensor claimed in claim 1, wherein the first conductive element is a sense line, and the second and third conductive elements are drive lines.

7. A touch sensor comprising:
   substrate having a sensing area and a first, second and third conductive element;
   the first and the second conductive elements disposed on the substrate such that at least a portion of each of the first and the second conductive elements are within the sensing area, and being arranged such that for any two given points on the first conductive element within the sensing area, the nearest point to each on the second conductive element within the sensing area is a different distance away;
   the third conductive element being disposed on the substrate such that at least a portion of the third conductive element is within the sensing area, and being arranged such that the third conductive element crosses the second conductive element, and is conductively isolated therefrom;
   the first and the third conductive elements being arranged such that for any two given points on the first conductive element within the sensing area, the nearest point to each on the third conductive element within the sensing area is a different distance away;
   further comprising a fourth conductive element disposed on the substrate at least partially within the sensing area, the fourth conductive element being conductively isolated from each of the first, second and third conductive elements, and arranged such that:
   for any two given points on the fourth conductive element within the sensing area, the nearest point to each on the second conductive element within the sensing area is a different distance away, and for any two given points on the fourth conductive element within the sensing area, the nearest point to each on the third conductive element within the sensing area is a different distance away.

8. A touch sensor comprising:

substrate having a sensing area and a first, second and third conductive element;

the first and the second conductive elements disposed on the substrate such that at least a portion of each of the first and the second conductive elements are within the sensing area, and being arranged such that for any two given points on the first conductive element within the sensing area, the nearest point to each on the second conductive element within the sensing area is a different distance away;

the third conductive element being disposed on the substrate such that at least a portion of the third conductive element is within the sensing area, and being arranged such that the third conductive element crosses the second conductive element, and is conductively isolated therefrom;

the first and the third conductive elements being arranged such that for any two given points on the first conductive element within the sensing area, the nearest point to each on the third conductive element within the sensing area is a different distance away;

further comprising drive circuitry operatively connected to the second and third conductive elements;

sense circuitry operatively connected to the first and fourth conductive elements;

signal processor configured to:

determine a first touch delta between the first and second conductive elements;

determine a second touch delta between the first and third conductive elements;

determine a third touch delta between the second and fourth conductive elements;

determine a fourth touch delta between the third and fourth conductive elements; and determine a location of a touch on the touch sensor based upon the first, second, third and fourth touch deltas.

* * * * *